United States Patent
Xu et al.

(10) Patent No.: US 11,770,076 B2
(45) Date of Patent: Sep. 26, 2023

(54) SYSTEM AND METHOD FOR CONTROLLING ACTIVE CLAMP FLYBACK CONVERTER

(71) Applicants: SOUTHEAST UNIVERSITY, Nanjing (CN); CSMC TECHNOLOGIES FAB2 CO., LTD., Wuxi (CN)

(72) Inventors: Shen Xu, Wuxi (CN); Minggang Chen, Wuxi (CN); Wanqing Yang, Wuxi (CN); Dejin Wang, Wuxi (CN); Rui Jiang, Wuxi (CN); Weifeng Sun, Wuxi (CN); Longxing Shi, Wuxi (CN)

(73) Assignees: SOUTHEAST UNIVERSITY, Jiangsu (CN); CSMC TECHNOLOGIES FAB2 CO., LTD., Jiangsu (CN)

( * ) Notice: Subject to any disclaimer, the term of this patent is extended or adjusted under 35 U.S.C. 154(b) by 175 days.

(21) Appl. No.: 17/420,866

(22) PCT Filed: Jun. 19, 2020

(86) PCT No.: PCT/CN2020/097118
§ 371 (c)(1),
(2) Date: Jul. 6, 2021

(87) PCT Pub. No.: WO2020/253826
PCT Pub. Date: Dec. 24, 2020

(65) Prior Publication Data
US 2022/0069718 A1    Mar. 3, 2022

(30) Foreign Application Priority Data
Jun. 20, 2019 (CN) .......................... 201910538741.8

(51) Int. Cl.
*H02M 3/335* (2006.01)
*H02M 1/38* (2007.01)
*H02M 1/34* (2007.01)

(52) U.S. Cl.
CPC ....... *H02M 3/33569* (2013.01); *H02M 1/342* (2021.05); *H02M 1/38* (2013.01); *H02M 3/33523* (2013.01)

(58) Field of Classification Search
CPC .......... H02M 1/38; H02M 1/34; H02M 1/342; H02M 1/0058
See application file for complete search history.

(56) References Cited

U.S. PATENT DOCUMENTS

| 10,205,377 B1* | 2/2019 | Bianco ................ H02M 1/083 |
| 2013/0063985 A1* | 3/2013 | Ye ...................... H02M 3/3353 363/21.05 |

(Continued)

FOREIGN PATENT DOCUMENTS

| CN | 1324141 A | 11/2001 |
| CN | 102 347 694 A | 2/2012 |

(Continued)

OTHER PUBLICATIONS

Sebastien Larousse et al. "Active Dead-Time Optimization for Wide Range Flyback Active-Clamp Converter", PCIM Europe 2016; International Exhibition and Conference for Power Electronics, Intelligent Motion, Renewable Energy and Energy Management, May 12, 2016, pp. 1707-1712.

(Continued)

*Primary Examiner* — Gustavo A Rosario-Benitez
(74) *Attorney, Agent, or Firm* — Dority & Manning, P.A.

(57) ABSTRACT

Disclosed are a system and method for controlling an active clamp flyback (ACF) converter. The system includes: a drive module configured to control turning-on or turning-off of a main switching transistor $S_L$ and a clamp switching transistor $S_H$; a main switching transistor voltage sampling circuit configured to sample a voltage drop between an input terminal and an output terminal of the main switching transistor $S_L$; a first comparator connected to the main (Continued)

switching transistor voltage sampling circuit and configured to determine whether a sampled first sampling voltage is a positive voltage or a negative voltage; and a dead time calculation module configured to adjust, according to an output of the first comparator and a main switching transistor control signal DUTYL of a current cycle, a clamp switching transistor control signal DUTYH of next cycle outputted by the drive module.

10 Claims, 5 Drawing Sheets

(56) References Cited

U.S. PATENT DOCUMENTS

| | | | |
|---|---|---|---|
| 2017/0005585 A1 | 1/2017 | Shimura et al. | |
| 2017/0264206 A1* | 9/2017 | Rana | H02M 1/083 |
| 2018/0062529 A1* | 3/2018 | Song | H02M 3/33569 |
| 2018/0069480 A1* | 3/2018 | Koo | H02M 3/33523 |
| 2018/0287481 A1 | 10/2018 | Liu et al. | |
| 2018/0301974 A1 | 10/2018 | Lin et al. | |
| 2018/0301975 A1* | 10/2018 | Lin | H02M 1/083 |
| 2020/0403521 A1* | 12/2020 | Zheng | H02M 3/33592 |
| 2021/0242784 A1* | 8/2021 | Yang | H02M 3/33523 |

FOREIGN PATENT DOCUMENTS

| | | |
|---|---|---|
| CN | 103 795 260 A | 5/2014 |
| CN | 105 580 497 A | 5/2016 |
| CN | 205 960 954 U | 2/2017 |
| CN | 107 181 410 A | 9/2017 |
| CN | 107 896 062 A | 4/2018 |
| CN | 108 736 729 A | 11/2018 |
| CN | 108 809 107 A | 11/2018 |
| CN | 109 245 569 A | 1/2019 |
| JP | 3022620 B2 | 3/2000 |

OTHER PUBLICATIONS

Chinese Patent Office—Office Action, dated Jun. 3, 2021.
PCT Search Report, dated Aug. 28, 2020.

* cited by examiner

SYSTEM AND METHOD FOR CONTROLLING ACTIVE CLAMP FLYBACK CONVERTER

CROSS REFERENCE TO RELATED APPLICATION

This application is a national stage of PCT Patent Application No. PCT/CN2020/097118, entitled "CONTROL SYSTEM AND METHOD FOR ACTIVE CLAMP FLYBACK CONVERTER", filed on Jun. 19, 2020; which claims priority to Chinese application No. 2019105387418, entitled "CONTROL SYSTEM AND METHOD FOR ACTIVE CLAMP FLYBACK CONVERTER", filed on Jun. 20, 2019, the contents of which are incorporated by reference herein in their entirety.

TECHNICAL FIELD

The present disclosure relates to flyback converters, more particularly, to a system and method for controlling an active clamp flyback (ACF) converter.

BACKGROUND

A power supply is an indispensable part of each electronic device, and its performance is directly related to technical indicators of the electronic device and whether the electronic device can operate safely and reliably. At present, a mainstream application is a switch mode power supply. The switch mode power supply is also referred to as a switch converter, which is a power supply that makes an output voltage constant by adjusting a conduction ratio or frequency of a switch device by using a modem power electronics technology.

With the continuous development and prosperity of the consumer electronics market, a fast charge technology has also made great progress. Due to the driving force from the consumer market, the charger (i.e. switch mode power supply) is making steady progress towards high efficiency and high power density. The pursuit of high power density definitely needs to reduce the volume of the charger, and then needs to improve an operating frequency of the switch mode power supply, the $3^{rd}$ generation semiconductor GaN (gallium nitride) makes high-frequency switches possible.

After the operating frequency of the switch mode power supply is increased, a switching loss positively correlated with a switching frequency may definitely increase, which may bring a series of problems such as the reduction of the efficiency of the switch mode power supply, heat dissipation, noise, and so on. Under the background of development, the topology of ACF converters, which was proposed as early as in the 1990s, has returned to the field of vision of switch mode power supply designers.

In early designs, a dead time left between complementary gate drive signals was designed to be a sufficiently fixed value, such as one quarter of a resonance cycle. However, under different input voltage conditions and different load conditions, a length of the dead time needed to realize zero-voltage-switching (ZVS) of a switch is different, and a too long or too short dead time is obviously inappropriate. If a too short dead time is set, two switches may be turned on at the same time, ZVS cannot be realized, and serious current oscillation may occur. On the contrary, if a too long dead time is set, the reverse conduction loss of the switches increases.

SUMMARY

In view of the above, there is a need to provide a system and method for controlling an ACF converter, to adaptively control a dead time.

A system for controlling an ACF converter is provided, the ACF converter including a transformer primary side and a transformer secondary side, the primary side including a primary winding, a main switching transistor and a clamp switching transistor, and the system including: a drive module configured to control turning-on or turning-off of the main switching transistor and the clamp switching transistor; a main switching transistor voltage sampling circuit configured to sample a voltage drop between an input terminal and an output terminal of the main switching transistor; a first comparator connected to the main switching transistor voltage sampling circuit and configured to determine whether a sampled first sampling voltage is a positive voltage or a negative voltage; and a dead-time calculation module configured to adjust, according to an output of the first comparator and a main switching transistor control signal of a current cycle, a clamp switching transistor control signal of next cycle outputted by the drive module; the adjusting including decreasing a high-level duration of the clamp switching transistor control signal of the next cycle when a rising edge of the main switching transistor control signal of the current cycle comes ahead of the negative voltage, and increasing the high-level duration of the clamp switching transistor control signal of the next cycle when the rising edge comes at the end of the negative voltage.

A method for controlling an ACF converter is provided, the ACF converter including a transformer primary side and a transformer secondary side, the primary side including a primary winding, a main switching transistor and a clamp switching transistor, and the method including: sampling a voltage drop between an input terminal and an output terminal of the main switching transistor; and adjusting, according to a sampled first sampling voltage and a main switching transistor control signal of a current cycle, a clamp switching transistor control signal of next cycle; the adjusting including decreasing a high-level duration of the clamp switching transistor control signal of the next cycle when a rising edge of the main switching transistor control signal of the current cycle comes ahead of a negative period of the first sampling voltage, and increasing the high-level duration of the clamp switching transistor control signal of the next cycle when the rising edge comes at the end of the negative period. The above control method realizes adaptive control over the dead time from turning-off of the clamp switching transistor $S_H$ to turning-on of the main switching transistor $S_L$.

Details of one or more embodiments of the present application are set forth in the following accompanying drawings and descriptions. Other features, objectives, and advantages of the present application become obvious with reference to the specification, the accompanying drawings, and the claims.

BRIEF DESCRIPTION OF THE DRAWINGS

In order to better describe and illustrate embodiments and/or examples of those applications disclosed herein, reference may be made to one or more accompanying drawings.

Additional details or examples used to describe the accompanying drawings should not be considered as limitations on the scope of any of the disclosed applications, the presently described embodiments and/or examples, and the presently understood best mode of these applications.

FIG. 1 is a schematic circuit diagram of a conventional ACF converter.

DETAILED DESCRIPTION OF THE EMBODIMENTS

To facilitate the understanding of the present disclosure, a more comprehensive description of the present disclosure is given below with reference to the accompanying drawings. Preferred embodiments of the present disclosure are given in the accompanying drawings. However, the present disclosure may be implemented in many different forms and is not limited to the embodiments described herein. On the contrary, these embodiments are provided to understand the disclosed content of the present disclosure more thoroughly and comprehensively.

Unless otherwise defined, all technical and scientific terms used herein have the same meaning as commonly understood by those of ordinary skill in the art to which the present disclosure belongs. The terms used in the specification of the present disclosure are intended only to describe particular embodiments and are not intended to limit the present disclosure. The term "and/or" used herein includes any and all combinations of one or more of the associated listed items.

Figure 1:
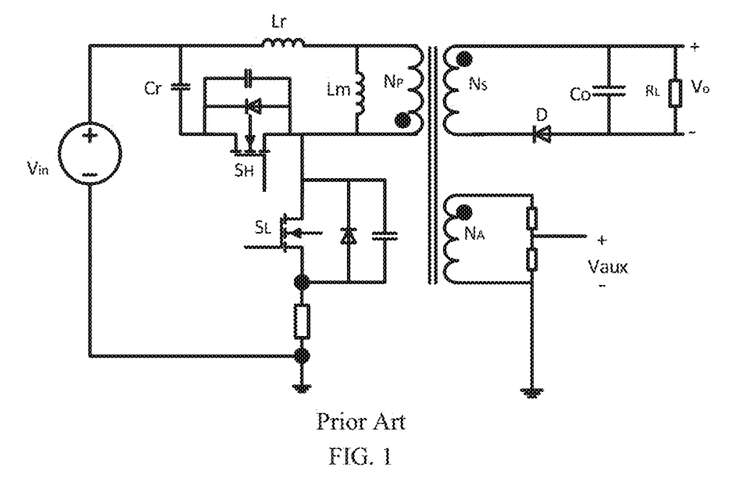

An ACF converter is developed on the basis of a conventional flyback converter. The ACF converter is obtained by replacing a passive clamp circuit in the conventional flyback converter with a clamp switching transistor and a clamp capacitor, as shown in FIG. 1. The ACF converter uses a clamp capacitor resonates, through the clamp capacitor, with leakage inductance of a transformer to absorb and recycle leakage inductance energy, and at the same time realizes ZVS of the switches. Therefore, the ACF converter can realize the switching loss close to 0 and reduce switching noise. At a relatively high switching frequency (MHz level), ZVS of the main switching transistor cannot be realized solely by relying on the leakage inductance energy. In this case, an excitation current needs to drop below zero to assist the ZVS of the main switching transistor. In conclusion, the ACF converter operating in a bidirectional excitation current state is applicable to high frequency, high efficiency, and high power density switch mode power supply fields.

Figure 2:
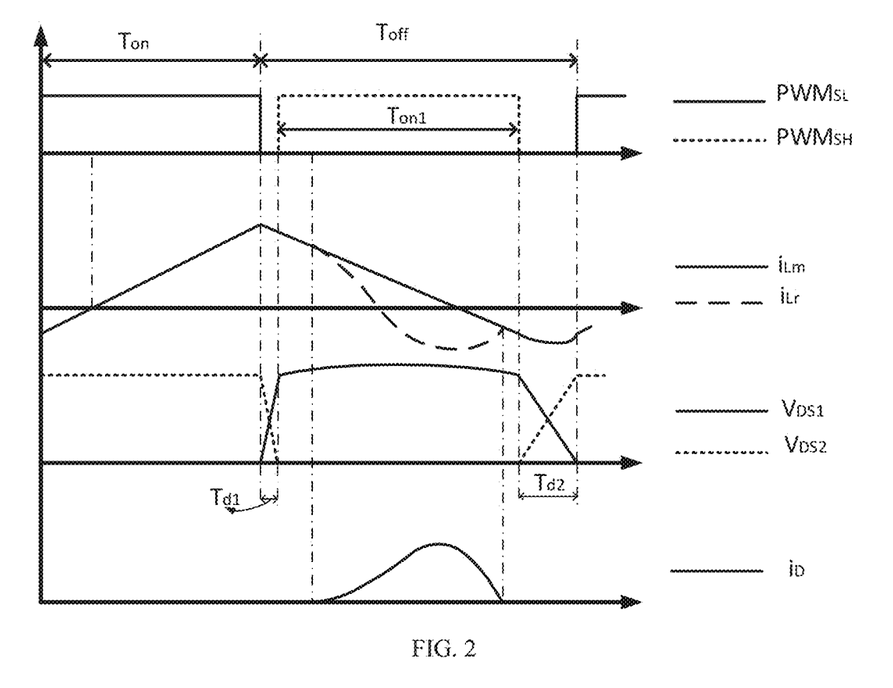
FIG. 2 is a schematic diagram of a main signal waveform of an ACF converter under a stable operating state.

During operation of the ACF converter, the clamp switching transistor and the main switching transistor are driven by two complementary gate drive signals. Due to non-ideal characteristics of the switching transistors, there is a parasitic capacitor between the drain and the source. When the switching transistors are turned on and turned off, the actions cannot happen instantly. It takes time for the capacitor to charge and discharge. Therefore, a dead time is required between the complementary gate drive signals to avoid the simultaneous conduction of the two switching transistors and the failure to realize ZVS. A dead time from turning-off of the main switching transistor $S_L$ to turning-on of the clamp switching transistor $S_H$ is denoted by $T_{d1}$; and a dead time from turning-off of the clamp switching transistor $S_H$ to turning-on of the main switching transistor $S_L$ is denoted by $T_{d2}$. A main signal waveform of an ACF converter under a stable operating state is as shown in FIG. 2.

Figure 3:
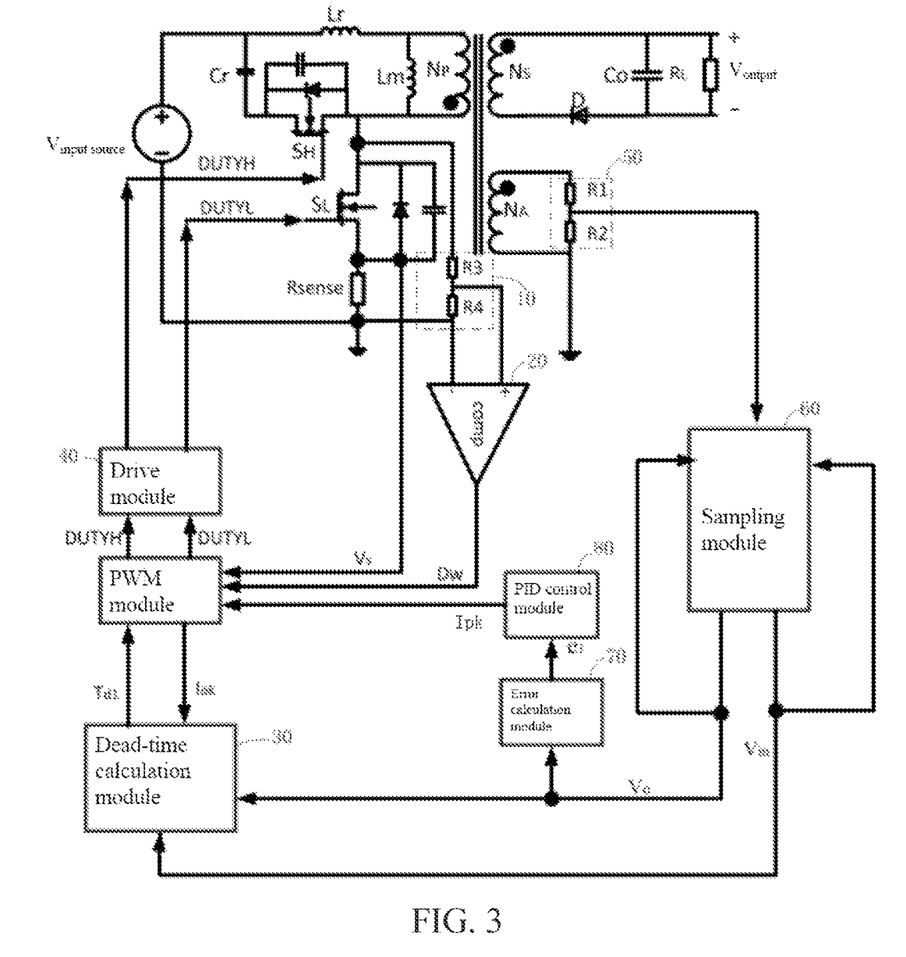
FIG. 3 is a circuit topology diagram of a system for controlling an ACF converter according to an embodiment.

FIG. 3 is a circuit topology diagram of a system for controlling an ACF converter according to an embodiment. The ACF converter may be of a conventional structure. In the embodiment shown in FIG. 3, the ACF converter includes a transformer primary side and a transformer secondary side. The primary side includes a primary winding Np, an excitation inductor Lm, a resonant inductor Lr, a main switching transistor $S_L$, a clamp switching transistor $S_H$, and a clamp capacitor Cr. The secondary side includes a secondary winding Ns, a rectifier diode D, an output capacitor Co, and a load resistor $R_L$. The excitation inductor Lm is connected in parallel with the primary winding Np, and the rectifier diode D is connected in series with the secondary winding Ns.

In the embodiment shown in FIG. 3, the system for controlling an ACF converter includes a main switching transistor voltage sampling circuit 10, a first comparator 20, a dead-time calculation module 30 and a drive module 40.

The main switching transistor voltage sampling circuit 10 is configured to sample a voltage drop between an input terminal and an output terminal of the main switching transistor $S_L$. In the present embodiment, the main switching transistor $S_L$ is an NMOS field effect transistor, with an input terminal as a drain, an output terminal as a source, and a control terminal as a gate.

The first comparator 20 is connected to the main switching transistor voltage sampling circuit 10 and configured to determine whether a first sampling voltage sampled by the main switching transistor voltage sampling circuit 10 is a positive voltage or a negative voltage.

The dead-time calculation module 30 is configured to adjust, according to an output of the first comparator 20 and a main switching transistor control signal DUTYL of a current cycle, a clamp switching transistor control signal DUTYH of next cycle outputted by the drive module 40. Specifically, the dead-time calculation module 30 decreases a high-level duration of the clamp switching transistor control signal DUTYH of the next cycle when a rising edge of the main switching transistor control signal DUTYL of the current cycle comes ahead of a negative value of the first sampling voltage, and increases the high-level duration of the clamp switching transistor control signal DUTYH of the next cycle when the rising edge comes at the end of the negative value of the first sampling voltage.

Figure 4:
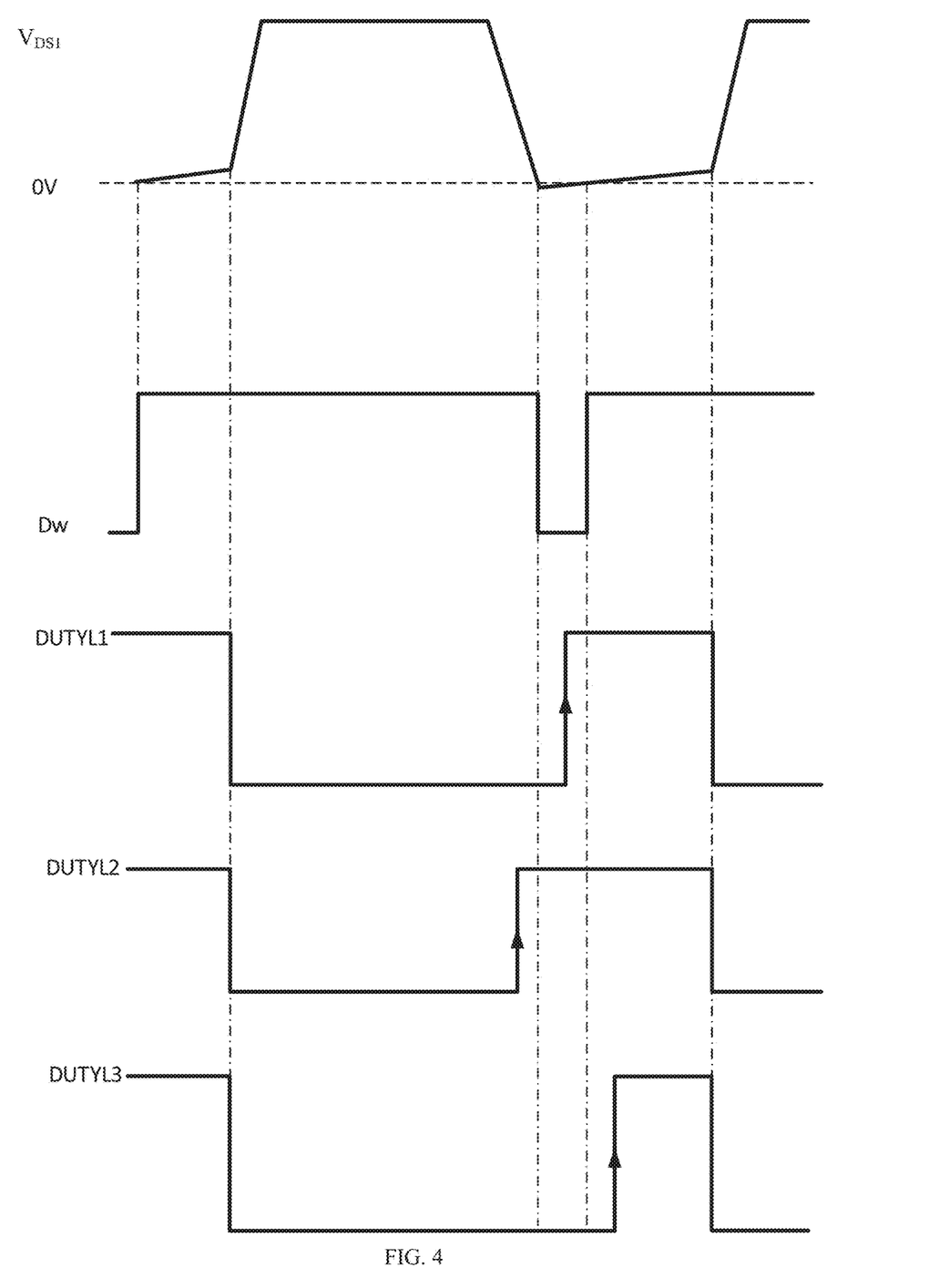
FIG. 4 is a timing chart of a main switching transistor control signal DUTYL and $V_{DS1}$ according to an embodiment.

FIG. 4 is a timing chart of a main switching transistor control signal DUTYL and $V_{DS1}$ according to an embodiment, which illustrates three possible situations of the main switching transistor control signal DUTYL at a given source-drain voltage $V_{DS1}$ of the main switching transistor $S_L$. Since on-resistance of the main switching transistor $S_L$ is not 0, $V_{DS1}$ is a rising waveform during a low level thereof. $D_w$ is the output of the first comparator 20. $D_w$ is a high level (i.e. $D_w=1$) when $V_{DS1}$ is greater than 0, and is a low level (i.e. $D_w=0$) when $V_{DS1}$ is less than 0. If the rising edge of DUTYL comes during $D_w=0$, the dead time $T_{d2}$ (a dead time from turning-off of the clamp switching transistor $S_H$ to turning-on of the main switching transistor $S_L$) in this case is optimal, as shown by DUTYL1 in FIG. 4, which is denoted as 1. If the rising edge of DUTYL comes during $D_w=1$ and a falling edge of $D_w$ has not come yet, the dead time $T_{d2}$ is too short in this case, as shown by DUTYL2 in FIG. 4, which is denoted as 2. If the rising edge of DUTYL comes during $D_w=1$ and the falling edge of $D_w$ has passed, the dead time $T_{d2}$ in this case is too long, as shown by DUTYL3 in FIG. 4, which is denoted as 3.

In situation 1, $T_{on1}(n+1)=T_{on1}(n)$ that is, $T_{d2}$ is kept constant;

in situation 2, $T_{on1}(n+1)=T_{on1}(n)-1$, that is, $T_{d2}$ is increased; and in situation 3, $T_{on1}(n+1)=T_{on1}(n)+1$, that is, $T_{d2}$ is decreased. $T_{on1}(n)$ is a high-level duration of the clamp switching transistor control signal DUTYH of the current cycle, and $T_{on1}(n+1)$ is a high-level duration of the clamp switching transistor control signal DUTYH of the next cycle. +1/−1 indicates slightly increasing/decreasing $T_{on1}(n)$. A specific increment or decrement may be preset according to experience. In one embodiment, the dead-time calculation module 30 is implemented through a digital circuit (for example, through a microcontroller MCU), and thus +1 or −1 can be performed precisely through digital control.

The drive module 40 is configured to control turning-on or turning-off of the main switching transistor $S_L$ and the clamp switching transistor $S_H$.

The system for controlling an ACF converter can adaptively control the dead time $T_{d2}$ from turning-off of the clamp switching transistor $S_H$ to turning-on of the main switching transistor $S_L$, features a simple, easy and low-cost scheme, and can accurately obtain a reasonable dead time for each cycle, so that switching loss, current oscillation and switching noise can be reduced. The adaptation of the dead-time $T_{d2}$ can be realized only by the first comparator and a corresponding judgment circuit, thus saving the cost.

In one embodiment, the system for controlling an ACF converter further includes a pulse width modulation (PWM) module. A signal outputted by the drive module 40 is determined by a PWM signal outputted by the PWM module.

In one embodiment, the first comparator 20 is a zero-crossing comparator, with a negative input terminal grounded and a positive input terminal connected to the main switching transistor voltage sampling circuit 10. It is determined through the zero-crossing comparator whether a ZVS condition of the main switching transistor is satisfied.

In the embodiment shown in FIG. 3, the main switching transistor voltage sampling circuit 10 is a sampling branch connected between a drain of the main switching transistor and the ground, including resistors R3 and R4 connected in series. The positive input terminal of the first comparator 20 is connected to one end of the resistor R4 connected to the resistor R3, and the other end of the resistor R4 is grounded.

The above introduces an adaptive control scheme of $T_{d2}$. The dead time $T_{d1}$ from turning-off of the main switching transistor $S_L$ to turning-on of the clamp switching transistor $S_H$ may be controlled by using a conventional scheme. Further, the inventor provides an adaptive control scheme of $T_{d1}$, which may be used in conjunction with any of the above embodiments.

In one embodiment, the dead-time calculation module 30 is further configured to calculate the dead time $T_{d1}$ according to an inductance value of the excitation inductor Lm, a drain-source parasitic capacitance value $C_1$ of the main switching transistor, a peak current of the excitation inductor Lm, an input voltage value Vin of the flyback converter, and an output voltage value $V_O$ of the flyback converter. The drive module 40 is configured to control turning-on or turning-off of the main switching transistor $S_L$ and the clamp switching transistor $S_H$ according to $T_{d1}$ and $T_{d2}$.

Figure 5:
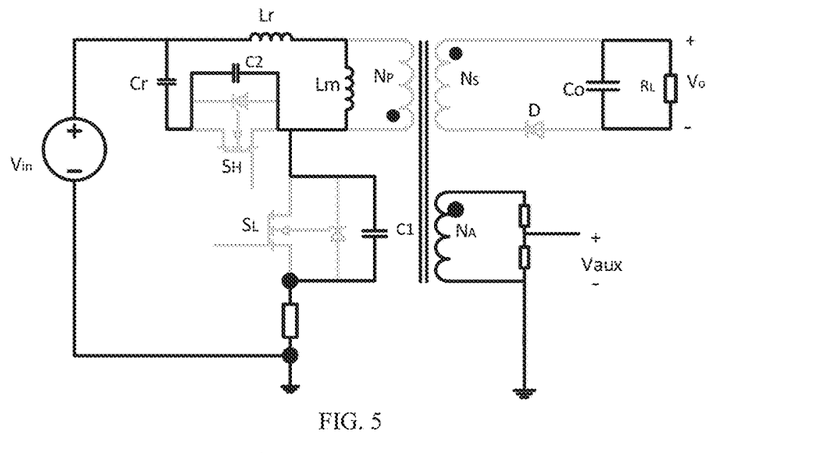
FIG. 5 is an equivalent simplified schematic circuit diagram of the circuit shown in FIG. 1 during a dead time $T_{d1}$.

During the dead time $T_{d1}$, the circuit may be simplified as shown by FIG. 5, where blurring components and circuits are equivalent to being nonexistent after simplification.

In this case, an excitation current charges a drain-source parasitic capacitor $C_1$ of the main switching transistor, and at the same time, discharges a drain-source parasitic capacitor $C_2$ of the clamp switching transistor. A resonance process may be expressed as:

$$V_{DS1}(t)=I_{PK}Z_m \sin(\omega_m t)+V_{in}-V_{in}\cos(\omega_m t) \quad (1)$$

where $V_{DS1}$ is a source-drain voltage of the main switching transistor $S_L$, $$\omega_m = \frac{1}{\sqrt{L_m C_1}}, Z_m = \sqrt{\frac{L_m}{C_1}},$$

Vin is the input voltage value of the flyback converter, and $I_{PK}$ is the peak value of the excitation inductor Lm.

In the embodiment shown in FIG. 3, the system for controlling an ACF converter further includes an auxiliary winding $N_A$, an auxiliary winding sampling circuit 50 and a sampling module 60. The auxiliary winding sampling circuit 50 is configured to sample a voltage of the auxiliary winding $N_A$ and output a sampled second sampling voltage Vaux to the sampling module 60. The sampling module 60 is configured to calculate and output the output voltage value $V_O$ of the flyback converter and the input voltage value Vin of the flyback converter to the dead-time calculation module 30. The dead-time calculation module 30 then calculates $T_{d1}$. In one embodiment, $T_{d1}$ may be calculated according to formula (1).

Figure 6:
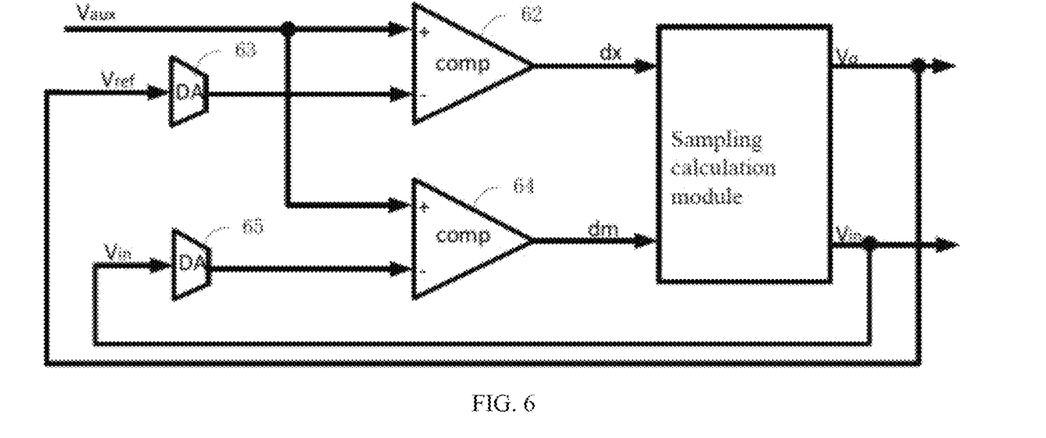
FIG. 6 is a schematic structural diagram of a sampling module according to an embodiment.

FIG. 6 is a schematic structural diagram of a sampling module 60 according to an embodiment. The sampling module 60 includes a second comparator 62, a third comparator 64 and a sampling calculation module.

A positive input terminal of the second comparator 62 is configured to input the second sampling voltage Vaux, and a negative input terminal thereof is configured to input the output voltage value $V_O$ of the flyback converter outputted by the sampling calculation module.

A positive input terminal of the third comparator 64 is configured to input the second sampling voltage Vaux, and a negative input terminal thereof is configured to input the input voltage value Vin of the flyback converter outputted by the sampling calculation module.

The sampling calculation module is configured to calculate and output the input voltage value Vin of the flyback converter and the output voltage value $V_O$ of the flyback converter, compare a high-level duration $t_{dx}$ of an output dx of the second comparator 62 in the current cycle with a reference duration Δt, increase an output voltage value $V_O(n+1)$ of the flyback converter of the next cycle outputted by the sampling calculation module if the high-level duration $t_{dx}$ is greater than the reference duration Δt, and decrease the output voltage value $V_O(n+1)$ of the flyback converter of the next cycle outputted by the sampling calculation module if the high-level duration $t_{dx}$ is less than the reference duration Δt.

The sampling calculation module is further configured to compare a high-level duration $t_{dm}$ of an output dm of the third comparator 64 in the current cycle with a reference duration Δt1, increase an input voltage value $V_{in}(n+1)$ of the flyback converter of the next cycle outputted by the sampling calculation module if $t_{dm}$ is greater than Δt1, and decrease the input voltage value $V_{in}$(n+1) of the flyback converter of the next cycle outputted by the sampling calculation module if tam is less than Δt1.

Figure 7:
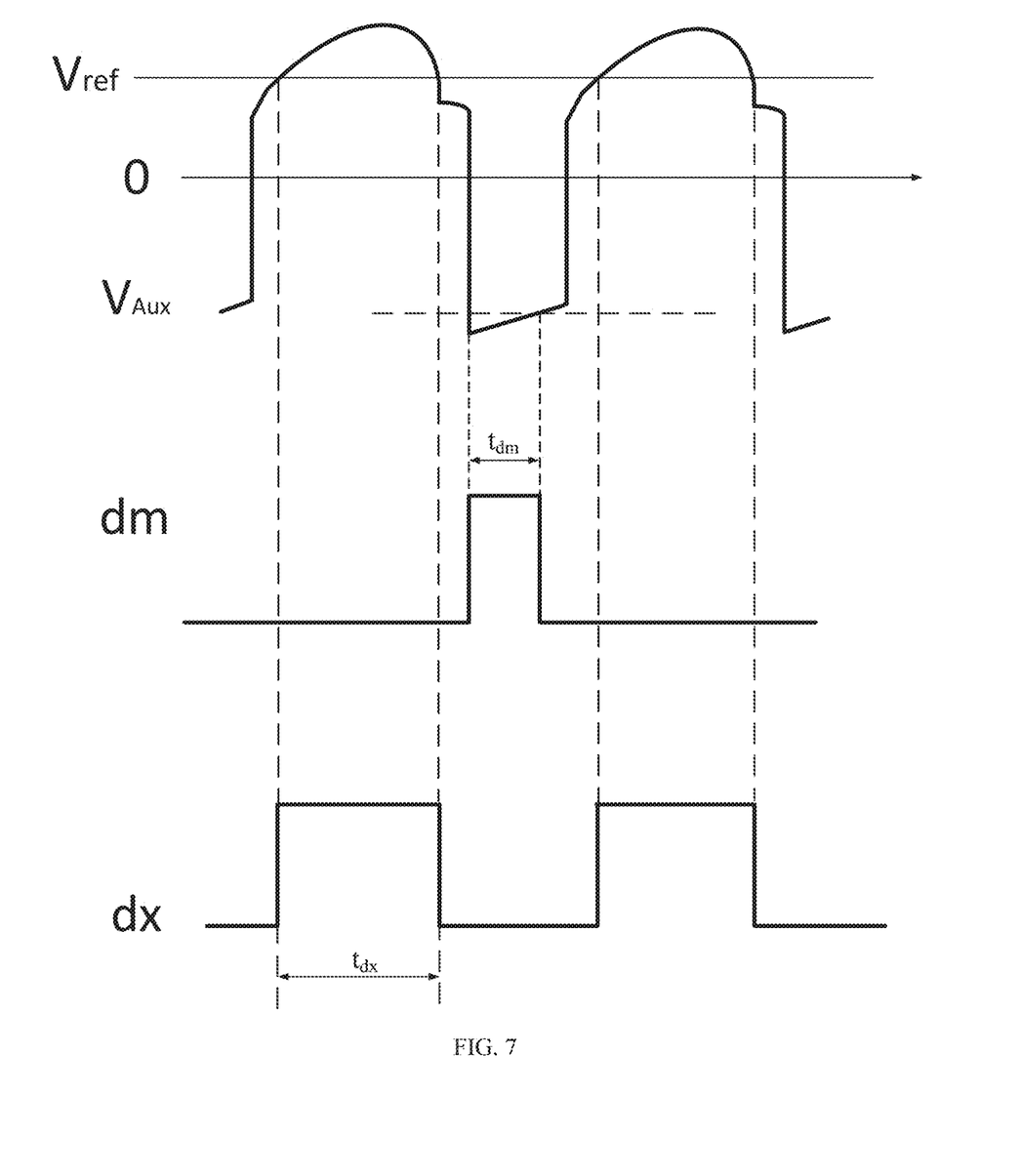
FIG. 7 is a schematic diagram of operation waveforms of a sampling module according to an embodiment.

For a specific embodiment, in a stable operating state, the sampling module 60 calculates the output voltage value $V_O$ of the flyback converter and the input voltage value Vin of the flyback converter according to waveform characteristics of the auxiliary winding $N_A$. Operation waveforms of sampling are as shown in FIG. 7.

When the output voltage value $V_O$ of the flyback converter is sampled, a size relationship between the period $t_{dx}$ of the output dx=1 of the comparator and the reference duration Δt is determined.

If $t_{dx} > \Delta t, V_O(n+1) = V_O(n)+1$.

If $t_{dx} < \Delta t, V_O(n+1) = V_O(n)-1$; and

If $t_{dx} = \Delta t, V_O(n+1) = V_O(n)$.

$V_O$(n+1) is an output voltage value of the flyback converter outputted by the sampling calculation module in next cycle, and $V_O$(n) is an output voltage value of the flyback converter outputted by the sampling calculation module in a current cycle. +1/−1 indicates slightly increasing/decreasing $V_O$(n). A specific increment or decrement may be preset according to experience. In one embodiment, the sampling calculation module is implemented through a digital circuit (for example, through a microcontroller MCU), and thus +1 or −1 can be performed precisely through digital control.

When an input voltage is sampled, a size relationship between the period $t_{dm}$ of the output dm=1 of the comparator and the reference duration Δt1 is determined.

If $t_{dm} > \Delta t1, V_{in}(n+1) = V_{in}(n)+1$; and if $t_{dm} < \Delta t1, V_{in}(n+1) = 1V_{in}(n)-1$; and if $t_{dm} = \Delta t1, V_{in}(n+1) = V_{in}(n)$ $V_{in}$(n+1) is an input voltage value of the flyback converter outputted by the sampling calculation module in next cycle, and $V_{in}$(n) is an input voltage value of the flyback converter outputted by the sampling calculation module in a current cycle. +1/−1 indicates slightly increasing/decreasing $V_{in}$(n). A specific increment or decrement may be preset according to experience. In one embodiment, the sampling calculation module is implemented through a digital circuit (for example, through a microcontroller MCU), and thus +1 or −1 can be performed precisely through digital control.

In the embodiment shown in FIG. 6, the sampling module 60 further includes a first digital-to-analog converter 63 connected between the first output terminal and the negative input terminal of the second comparator 62 and a second digital-to-analog converter 65 connected between the second output terminal and the negative input terminal of the third comparator 64. A digital signal outputted by the sampling calculation module is converted into an analog signal through a digital-to-analog converter.

In the embodiment shown in FIG. 6, the sampling module 60 only uses two comparators and two digital-to-analog converters when sampling a primary-side output voltage and a secondary-side input voltage, but does not use any analog-digital converter, thereby reducing the cost of circuit implementation.

In the embodiment shown in FIG. 3, the system for controlling an ACF converter further includes an error calculation module 70 and a proportional integral differential (PID) module 80. The error calculation module is configured to acquire the output voltage value $V_O$ of the flyback converter outputted by the sampling module, take a difference of a reference voltage Vref minus $V_O$ as a sampling error el, and output the sampling error to the PID control module 80. The PID control module 80 calculates a peak current $I_{PK}$ according to the sampling error el.

When the excitation inductor Lm is sufficiently large, for example, when $L_m > 15$ pH the formula (1) may be simplified as:

$$V_{DS1}(t) = \frac{I_{PK}}{C_1}t \qquad (2)$$

Therefore, $$T_{d1} = \frac{C_1 V_{DS1}}{I_{PK}}.$$

According to $$V_{DS1} = \frac{V_O}{N} + V_{in},$$

N is the transformer (converter) turn ratio, and the following formula may be obtained:

$$T_{d1} = C_1(V_O + NV_{IN})/I_{PK}N \qquad (3)$$

Therefore, in one embodiment, an input signal of the dead-time calculation module 30 includes an output voltage value $V_O$ of the flyback converter, an input voltage value Vin of the flyback converter and a peak current $I_{PK}$. The dead-time calculation module 30 calculates a dead time $T_{d1}$ according to formula (3) and then sends it to a PWM module. The PWM module controls the drive module 40 to control turning-on or turning-off of the main switching transistor $S_L$ and the clamp switching transistor $S_H$.

In one embodiment, the first comparator 20, the dead-time calculation module 30, the sampling module 60, the error calculation module 70, and the PID module 80 are all implemented by using digital circuits. The adaptive control scheme for the dead time $T_{d1}$ of the system for controlling an ACF converter can give full play to the characteristics of the digital circuits which can perform complex operation, and the dead time $T_{d1}$ of each switching cycle is calculated. The control system shown in FIG. 3 is connected to a controlled switch mode power supply to form a closed loop. The length of the dead time can be adaptively adjusted according to different input voltage conditions and different load conditions, which is of great help to reduce switching loss and noise, making the power density and efficiency of circuit design more excellent.

Correspondingly, a method for controlling an ACF converter is further provided, including:
  sampling a voltage drop between an input terminal and an output terminal of the main switching transistor; and
  adjusting, according to a sampled first sampling voltage and a main switching transistor control signal of a current cycle, a clamp switching transistor control signal of next cycle; the adjusting including decreasing a high-level duration of the clamp switching transistor control signal of the next cycle when a rising edge of the main switching transistor control signal of the current cycle comes ahead of a negative period of the first sampling voltage, and increasing the high-level duration of the clamp switching transistor control signal of the next cycle when the rising edge comes at the end of the negative period.

In one embodiment, the ACF converter further includes an excitation inductor, and the method further includes:

calculating a first dead time according to an inductance value of the excitation inductor, a parasitic capacitance value of the main switching transistor, a peak current of the excitation inductor, an input voltage value of the flyback converter and the voltage drop, the first dead time being a time from turning-off of the main switching transistor to turning-on of the clamp switching transistor; and controlling turning-on or turning-off of the main switching transistor and the clamp switching transistor according to the first dead time.

In one embodiment, the ACF converter further includes an excitation inductor, and the method further includes:

calculating a first dead time according to a parasitic capacitance value of the main switching transistor, an input voltage value of the flyback converter, an output voltage value of the flyback converter, a transformer turn ratio of the ACF and a peak value of the excitation inductor, the first dead time being a time from turning-off of the main switching transistor to turning-on of the clamp switching transistor; and controlling turning-on or turning-off of the main switching transistor and the clamp switching transistor according to the first dead time.

In one embodiment, the first dead time is $T_{d1}=C_1(V_O+NV_{IN})/I_{PK}$; where $C_1$ is the parasitic capacitance value, $V_O$ is the output voltage value of the flyback converter, $V_{IN}$ is the input voltage value of the flyback converter, N is the transformer turn ratio, and $I_{PK}$ is the peak current.

In one embodiment, the ACF converter further includes an auxiliary winding, and the method further includes:

sampling a voltage of the auxiliary winding to obtain a second sampling voltage; and calculating the output voltage value of the flyback converter and the input voltage value of the flyback converter through a sampling calculation module; the output voltage value of the flyback converter is outputted to a negative input terminal of a second comparator, a positive input terminal of the second comparator inputs the second sampling voltage, and the sampling calculation module compares a high-level duration of an output of the second comparator in the current cycle with a first preset reference duration, increases an output voltage value of the flyback converter of the next cycle outputted by the sampling calculation module if the high-level duration is greater than the first preset reference duration, and decreases the output voltage value of the flyback converter of the next cycle outputted by the sampling calculation module if the high-level duration is less than the first preset reference duration; and the input voltage value of the flyback converter is outputted to a negative input terminal of a third comparator, a positive input terminal of the third comparator inputs the second sampling voltage, and the sampling calculation module compares a high-level duration of an output of the third comparator in the current cycle with a second preset reference duration, increases an input voltage value of the flyback converter of the next cycle outputted by the sampling calculation module if the high-level duration of the output of the third comparator in the current cycle is greater than the second preset reference duration, and decreases the input voltage value of the flyback converter of the next cycle outputted by the sampling calculation module if the high-level duration of the output of the third comparator in the current cycle is less than the second preset reference duration.

In one embodiment, the output voltage value of the flyback converter is outputted to the negative input terminal of the second comparator after digital-to-analog conversion; and the input voltage value of the flyback converter is outputted to the negative input terminal of the third comparator after digital-to-analog conversion.

In one embodiment, the method further includes: acquiring the output voltage value of the flyback converter outputted by the sampling module; taking a difference of a reference voltage minus the output voltage value of the flyback converter as a sampling error, and outputting the sampling error to the PID control module; and calculating, by the PID control module, the peak current according to the sampling error.

In one embodiment, prior to the sampling (including sampling a voltage drop between an input terminal and an output terminal of the main switching transistor and sampling a voltage of the auxiliary winding), a step of determining whether a soft start is ended is further included. The soft start is to prevent a large inrush current by limiting a start speed during an initial period of power on of the switch mode power supply to ensure the safe start of a power supply circuit.

In one embodiment, a step of determining whether an output voltage of the transformer secondary side is stable is further included. If yes, a PWM signal outputted to the main switching transistor and the clamp switching transistor is kept unchanged. If no, the PID control module re-adjusts the high-level duration Ton of the main switching transistor and the high-level duration Ton1 of the clamp switching transistor.

The above embodiments only describe several implementations of the present disclosure, which are described specifically and in detail, and therefore cannot be construed as a limitation on the patent scope of the present disclosure. It should be pointed out that those of ordinary skill in the art may make various changes and improvements without departing from the ideas of the present disclosure, which shall all fall within the protection scope of the present disclosure. Therefore, the patent protection scope of the present disclosure shall be subject to the appended claims.

The invention claimed is:

1. A system for controlling an active clamp flyback (ACF) converter, the ACF converter comprising a transformer primary side and a transformer secondary side, the primary side comprising a primary winding, a main switching transistor and a clamp switching transistor, and the system comprising:

a drive module configured to control turning-on or turning-off of the main switching transistor and the clamp switching transistor;

a main switching transistor voltage sampling circuit configured to sample a voltage drop between an input terminal and an output terminal of the main switching transistor;

a first comparator connected to the main switching transistor voltage sampling circuit and configured to determine whether a sampled first sampling voltage is a positive voltage or a negative voltage;

a dead-time calculation module configured to adjust, according to an output of the first comparator and a main switching transistor control signal of a current cycle, a clamp switching transistor control signal of next cycle outputted by the drive module; the adjusting comprising decreasing a high-level duration of the clamp switching transistor control signal of the next cycle when a rising edge of the main switching transistor control signal of the current cycle comes ahead of the negative voltage, and increasing the high-level duration of the clamp switching transistor control signal of the next cycle when the rising edge comes at an end of the negative voltage; and an excitation inductor;

wherein the dead-time calculation module is further configured to calculate a first dead time according to the voltage drop, an inductance value of the excitation inductor, a parasitic capacitance value of the main switching transistor, a peak current of the excitation inductor and an input voltage value of the flyback converter, and the first dead time is a time from the turning-off of the main switching transistor to the turning-on of the clamp switching transistor; and wherein the drive module is further configured to control the turning-on or the turning-off of the main switching transistor and the clamp switching transistor according to the first dead time;

the system further comprising an auxiliary winding, an auxiliary winding sampling circuit and a sampling module, the auxiliary winding sampling circuit being configured to sample a voltage of the auxiliary winding and output a sampled second sampling voltage to the sampling module, and the sampling module being configured to calculate and output an output voltage value of the flyback converter and an input voltage value of the flyback converter to the dead-time calculation module;

the sampling module comprising a second comparator, a third comparator and a sampling calculation module;

a positive input terminal of the second comparator is configured to input the second sampling voltage, and a negative input terminal thereof is configured to input the output voltage value of the flyback converter outputted by the sampling calculation module;

a positive input terminal of the third comparator is configured to input the second sampling voltage, and a negative input terminal thereof is configured to input the input voltage value of the flyback converter outputted by the sampling calculation module;

the sampling calculation module is configured to calculate and output the input voltage value of the flyback converter and the output voltage value of the flyback converter, compare a high-level duration of an output of the second comparator in the current cycle with a first preset reference duration, increase the output voltage value of the flyback converter of the next cycle outputted by the sampling calculation module if the high-level duration is greater than the first preset reference duration, and decrease the output voltage value of the flyback converter of the next cycle outputted by the sampling calculation module if the high-level duration is less than the first preset reference duration; and the sampling calculation module is further configured to compare a high-level duration of an output of the third comparator in the current cycle with a second preset reference duration, increase the input voltage value of the flyback converter of the next cycle outputted by the sampling calculation module if the high-level duration of the output of the third comparator in the current cycle is greater than the second preset reference duration, and decrease the input voltage value of the flyback converter of the next cycle outputted by the sampling calculation module if the high-level duration of the output of the third comparator in the current cycle is less than the second preset reference duration.

2. The system according to claim 1, wherein the ACF converter further comprises an excitation inductor, the dead-time calculation module is further configured to calculate a first dead time according to a parasitic capacitance value of the main switching transistor, an input voltage value of the flyback converter, an output voltage value of the flyback converter, a transformer turn ratio of the flyback converter and a peak value of the excitation inductor, and the first dead time is a time from turning-off of the main switching transistor to turning-on of the clamp switching transistor; and the drive module is further configured to control turning-on or turning-off of the main switching transistor and the clamp switching transistor according to the first dead time.

3. The system according to claim 2, wherein the first dead time is $T_{d1} = C_1(V_O + NV_{IN})/I_{PK}N$; where $C_1$ is the parasitic capacitance value, $V_O$ is the output voltage value of the flyback converter, $V_{IN}$ is the input voltage value of the flyback converter, $N$ is the transformer turn ratio, and $I_{PK}$ is the peak current.

4. The system according to claim 1, wherein the sampling calculation module outputs the output voltage value through a first output terminal and outputs the input voltage value through a second output terminal, and the sampling module further comprises a first digital-to-analog converter connected between the first output terminal and the negative input terminal of the second comparator, and a second digital-to-analog converter connected between the second output terminal and the negative input terminal of the third comparator.

5. The system according to claim 1, further comprising an error calculation module and a proportional integral differential (PID) control module, the error calculation module being configured to acquire the output voltage value of the flyback converter outputted by the sampling module, take a difference of a reference voltage minus the output voltage value of the flyback converter as a sampling error, and output the sampling error to the PID control module, and the PID control module is configured to calculate the peak current according to the sampling error.

6. The system according to claim 1, wherein the main switching transistor and the clamp switching transistor are MOS transistors, the input terminal is a drain, the output terminal is a source, and a control terminal is a gate.

7. A method for controlling an active clamp flyback (ACF) converter, the ACF converter comprising a transformer primary side and a transformer secondary side, the primary side comprising a primary winding, a main switching transistor and a clamp switching transistor, and the method comprising:

sampling a voltage drop between an input terminal and an output terminal of the main switching transistor; and adjusting, according to a sampled first sampling voltage and a main switching transistor control signal of a current cycle, a clamp switching transistor control signal of next cycle; the adjusting comprising decreasing a high-level duration of the clamp switching transistor control signal of the next cycle when a rising edge of the main switching transistor control signal of the current cycle comes ahead of a negative period of the first sampling voltage, and increasing the high-level duration of the clamp switching transistor control signal of the next cycle when the rising edge comes at an end of the negative period;

wherein the ACF converter further comprises an excitation inductor, and the method further comprises:

calculating a first dead time according to an inductance value of the excitation inductor, a parasitic capacitance value of the main switching transistor, a peak current of the excitation inductor, an input voltage value of the flyback converter and the voltage drop, the first dead time being a time from turning-off of the main switching transistor to turning-on of the clamp switching transistor; and controlling the turning-on or the turning-off of the main switching transistor and the clamp switching transistor according to the first dead time;

the ACF converter further comprises an auxiliary winding, and the method further comprises:

sampling a voltage of the auxiliary winding to obtain a second sampling voltage; and calculating the output voltage value of the flyback converter and the input voltage value of the flyback converter through a sampling calculation module;

wherein the output voltage value of the flyback converter is outputted to a negative input terminal of a second comparator, a positive input terminal of the second comparator inputs the second sampling voltage, and the sampling calculation module compares a high-level duration of an output of the second comparator in the current cycle with a first preset reference duration, increases the output voltage value of the flyback converter of the next cycle outputted by the sampling calculation module if the high-level duration is greater than the first preset reference duration, and decreases the output voltage value of the flyback converter of the next cycle outputted by the sampling calculation module if the high-level duration is less than the first preset reference duration; and wherein the input voltage value of the flyback converter is outputted to a negative input terminal of a third comparator, a positive input terminal of the third comparator inputs the second sampling voltage, and the sampling calculation module compares a high-level duration of an output of the third comparator in the current cycle with a second preset reference duration, increases the input voltage value of the flyback converter of the next cycle outputted by the sampling calculation module if the high-level duration of the output of the third comparator in the current cycle is greater than the second preset reference duration, and decreases the input voltage value of the flyback converter of the next cycle outputted by the sampling calculation module if the high-level duration of the output of the third comparator in the current cycle is less than the second preset reference duration.

8. The method according to claim 7, wherein the ACF converter further comprises an excitation inductor, and the method further comprises: calculating a first dead time according to a parasitic capacitance value of the main switching transistor, an input voltage value of the flyback converter, an output voltage value of the flyback converter, a transformer turn ratio of the flyback converter and a peak value of the excitation inductor, the first dead time being a time from turning-off of the main switching transistor to turning-on of the clamp switching transistor; and controlling turning-on or turning-off of the main switching transistor and the clamp switching transistor according to the first dead time.

9. The method according to claim 8, wherein the first dead time is $T_{d1}=C_1(V_O+NV_{IN})/I_{PK}N$; where $C_1$ is the parasitic capacitance value, $V_O$ is the output voltage value of the flyback converter, $V_{IN}$ is the input voltage value of the flyback converter, N is the transformer turn ratio, and $I_{PK}$ is the peak current.

10. The method according to claim 7, wherein the output voltage value is outputted to the negative input terminal of the second comparator after digital-to-analog conversion; and the input voltage value is outputted to the negative input terminal of the third comparator after digital-to-analog conversion.

* * * * *